United States Patent [19]
Koch

[11] Patent Number: 6,012,498
[45] Date of Patent: Jan. 11, 2000

[54] TIRES HAVING BELTS OF HIGH MODULUS COMPOSITES

[75] Inventor: Russell W. Koch, Hartville, Ohio

[73] Assignee: Bridgestone Corporation, Tokyo, Japan

[21] Appl. No.: 09/057,106

[22] Filed: Apr. 8, 1998

[51] Int. Cl.[7] .............................. B60C 9/18; B60C 19/12
[52] U.S. Cl. .................... 152/197; 152/526; 152/527; 152/530; 152/531; 152/537; 152/565
[58] Field of Search ...................... 152/516, 526, 152/530, 537, 527, 531, 565, 192, 196, 197, 520

[56] References Cited

U.S. PATENT DOCUMENTS

| | | | |
|---|---|---|---|
| 4,111,249 | 9/1978 | Markow | 152/516 |
| 4,318,434 | 3/1982 | Markow | 152/197 X |
| 4,708,186 | 11/1987 | Kopsco et al. | 152/530 X |
| 4,711,286 | 12/1987 | Kabe et al. | |
| 4,734,144 | 3/1988 | Markow | 152/526 X |
| 5,082,713 | 1/1992 | Gifford | |
| 5,201,971 | 4/1993 | Gifford | |
| 5,291,930 | 3/1994 | Kikuchi et al. | |
| 5,323,829 | 6/1994 | Hubbell et al. | |
| 5,413,160 | 5/1995 | Giuliano | |
| 5,513,683 | 5/1996 | Causa et al. | |
| 5,558,144 | 9/1996 | Nakayasu et al. | |
| 5,576,104 | 11/1996 | Causa et al. | |
| 5,879,484 | 3/1999 | Spragg et al. | 152/526 X |

*Primary Examiner*—Adrienne C. Johnstone
*Attorney, Agent, or Firm*—John H. Hornickel; Daniel N. Hall; Daniel J. Hudak

[57] ABSTRACT

Composites of high melting point thermoplastics such as polyphenylene sulfide or polyimide and high modulus fibers such as carbon, graphite, or boron can be bonded to rubber using a primer such as a metal primer. The composite desirably has a modulus of elasticity of at least 750,000 psi and can be used as a belt in a no-flat tire.

4 Claims, 1 Drawing Sheet

TIRES HAVING BELTS OF HIGH MODULUS COMPOSITES

FIELD OF THE INVENTION

The present invention relates to bonding high modulus composites to rubber utilizing a primer. More specifically, the present invention relates to the utilization of composites which have a very high modulus of elasticity and are adhered to the body of a tire to provide a no-flat tire.

BACKGROUND OF THE INVENTION

Heretofore, polyphenylene sulfide-high modulus fiber composites were generally not bonded to rubber. In the field of tires, various types of tire cords such as polyaramide, polyester, nylon, and the like was adhered to rubber utilizing various adhesives, see U.S. Pat. Nos. 4,711,286, 5,082,713, 5,201,971, 5,291,930, 5,323,829, 5,413,160, 5,513,683, 5,558,144, and 5,576,104.

SUMMARY OF THE INVENTION

High modulus composites contain high strength fibers such as carbon, graphite, or boron, which are bonded together by a high temperature binder such as a polyphenylene sulfide or a polyimide. Alternatively, high melting point polyurethane or polyurea binders can be utilized. The composites are bonded to various rubbers such as natural rubber, polybutadiene or styrene-butadiene rubber through the use of various primers. The composites have a very high modulus of elasticity (Young's modulus) and accordingly can be bonded to a rubber wherever a stiff reinforcement material is desired for the rubber.

DETAILED DESCRIPTION

Figure 1:
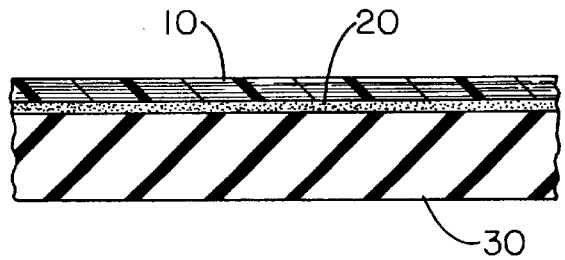
FIG. 1 is a cross sectional view of an article showing the composite adhered to a rubber substrate through the use of a primer.

The binder is a high melting point thermoplastic polymer such as polyphenylene sulfide or polyimide. Melting points of the polymer are generally at least 225° C. or 250° C., desirably at least 275° C., and preferably at least 300° C., 325° C., or even 350° C. Conventional polyphenylene sulfides can be utilized such as RYTON from Phillips Petroleum, and the like. The polyimides are preferably aromatic and available as KAPTON, VESPEL, and PYRALIN from DuPont and TORLON from Amoco.

Alternatively, high melting point polyurethanes and/or polyureas can also be utilized. The polyurethanes are derived from polysiocyanates which generally have the formula $R(NCO)_n$ where n is an integer of 2, 3 or 4 with approximately 2 being preferred. However, it is to be understood that since combinations of various polyisocyanates can be utilized, "n" can vary and often is not an integer. R is an aliphatic having from about 2 to about 20 carbon atoms or preferably an aromatic including an alkyl substituted aromatic having from about 6 to about 20 carbon atoms with from about 6 to about 15 carbon atoms being desired, or combinations thereof. Examples of suitable polyisocyanates include 1,6-diisocyanto hexane, 2,2,4- and/or 2,4,4-trimethylhexamethylene diisocyanate, p- and m-tetramethyl xylene diisocyanate, dicyclohexylmethane-4,4'-diisocyanate (Hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate and isopropylene bis-(p-phenyl isocyanate). TDI is desirably utilized. The various diphenylmethane diisocyanates (MDI) and mixtures of MDI with polymeric MDI having an average isocyanate functionality of from about 2 to about 3.2 are preferred.

The preparation of the polyurethanes and/or polyureas are well known to the art and to the literature. For example, a short chain oligomer or polymer derived from polyester or polyether polyols generally having a molecular weight of from about 55 to about 1,000 and preferably from about 6 to about 200 are reacted with the above-noted diisocyanates to form a urethane prepolymer. Similarly, a short chain diamine can be utilized and reacted with the above-noted diisocyanates to form a urea prepolymer. The short chain oligomers or polymers are desirably not crosslinked and aromatic diisocyanates are generally utilized to yield high melting point urethane or urea prepolymers which also generally have a high modulus of elasticity. The resulting prepolymer is subsequently reacted with diols, diamines, diacids, or amino alcohols, and the like to cure the same and form a polyurethane or polyurea. Alternatively, the polyurethanes and/or polyureas are formed by reacting an existing prepolymer with the above-noted curing or chain extending agents.

The equivalent ratio of isocyanate groups (NCO) reacted with the hydroxyl groups (OH) or amine groups ($NH_2$) of the short chain compound is generally from about 0.90 to about 1.10, desirably from about 0.95 to about 1.05, and preferably from about 0.98 to about 1.02.

Regardless of whether the binder is polyphenylene sulfide, polyimide, polyurethane, or polyurea, or combinations thereof, they generally have good resistance to organic solvents.

A fiber is utilized with the binder so that the resulting composite has high modulus and high strength. Preferred fibers include those having high modulus such as graphite or carbon. To a lesser extent, boron fibers, nylon fibers, polyester fibers, and glass fibers can also be utilized. While fibers, or combinations thereof of various lengths can be utilized, generally continuous filaments, that is filaments of very long length such as at least 20, 30, 50, or 100 meters and the like are desired. The amount of the fibers is generally from about 40 to about 90 parts by weight, desirably from about 50 to about 85 parts by weight, and preferably from about 60 to about 80 parts by weight for every 100 parts by weight of the high melting point polymeric binder.

The composite can be of any desired shape and form and typically is made by melting the binder onto a continuous wound fiber(s) or by mixing the fibers and the high temperature binder in a molten state, shaping the mixture into a desired form such as a sheet, and cooling. A preferred shape is in the form of a circular band which can be used as a belt to replace the steel cords utilized in a tire. When a continuous circular band is formed, it contains a plurality of layers impregnated with the binder wherein the ends of the various layers or belts are alternated about the circumference of the band to ensure strength. The modulus of elasticity of the composite, i.e., Young's modulus, is desirably at least 750,000 and preferably at least 1,000,000 psi.

When polyurethane or polyurea binders are utilized, the fibers are generally added during the polymerization thereof. Moreover, the polyurethanes or polyurea composites generally have a lower modulus, such as from about 250,00 to about 1,000,000 psi.

So high is the modulus and strength of the composite that it resists punctures from sharp objects such as nails, glass, metal, etc. Thus, essentially a no flat tire can be produced with regard to eliminating penetration by a sharp object through the tread portion thereof.

Rubbers to which the composite can be bound generally include natural rubber, rubbers made from conjugated diene monomers having from 4 to 10 carbon atoms such as butadiene, isoprene, hexadiene, and the like, as well as combinations thereof. Another suitable class of rubbers are various copolymers made from conjugated diene monomers having from 4 to 10 carbon atoms with vinyl substituted aromatic monomers having from 8 to 12 carbon atoms such as styrene, alpha-methyl styrene, and the like, with a preferred copolymer being styrene-butadiene rubber.

The rubbers can be compounded with conventional rubber additives such as fillers, for example, carbon black, magnesium oxide, etc., various antioxidants, various processing aids, stearic acid, zinc oxide, process oils, vulcanization compounds such as sulfur, zinc oxide, various vulcanization accelerators such as thiazoles, thiurams, sulfenamides, guanidines, and the like. Generally, a master batch is first formed and then curing compounds such as sulfur and various accelerators are added thereto, formed into an appropriate end product, and cured.

The composite is bonded to a very dissimilar material, i.e., rubber, through the use of generally specific types of primers so that a good bond is formed. The primer is generally applied to the composite, the rubber, or both, with the composite subsequently being bound to the rubber. Desirably, the rubber is uncured when the composite is bound thereto with the primer, and then subsequently the rubber is cured although less desirably, the rubber can be initially cured.

Surprising, it has been found that a desired class of primers are so-called metal primers which are applied to a metal so that other objects can be adhered thereto. Various metal primers desirably contain nitrosoamine compounds or derivatives thereof and include various CHEMLOK compounds manufactured by the Lord Corporation of Erie, Pa., U.S.A. A preferred primer is CHEMLOK 254 (Lord Corporation) which is a mixture of a polymer, a halogenated paraffin, and a curative, dissolved or dispersed in an organic solvent system such as toluene and xylene. This composition is generally a black liquid, has a viscosity range (Brookfield LVT, Spindle No. 2 at 30 rpm at 77° F. (25° C.)) of 150 to 450 centipoises, contains approximately 25–30 percent by weight of non-volatile contents, has a density of approximately 8.1 to 8.5 lbs./gal., a flash point of 44° F. (7° C.), and a shelf life of generally 6 months at 70–80° F. (21–26° C.) storage temperature. More specifically, CHEMLOK 254 is believed to be a mixture of chlorosulfonated polyethylene (for example, HYPALON 48) chlorinated paraffin (for example, CHLOROWAX 40), poly(p-dinitrosobenzene) and carbon black dissolved or dispersed in a mixture of toluene and xylene. The chlorosulfonated polyethylene is characterized by infrared (IR) spectroscopy as having absorption bands at 1420, 1428, 1362, 1250, 1162, 658, and 604 $cm^{-1}$ The chlorinated polyethylene is characterized by having IR absorption bands at 1458, 1445, 1371, 1258, 907, 789, 732, 651, and 613 $cm^{-1}$ Poly(p-dinitrosobenzene) was identified by IR absorption bands at 3111, 1483, 1458, 1258, 1102, 1008, 857, 776, and 563 $cm^{-1}$ CHEMLOK 254 also contained a small amount of yellow material which was characterized by IR absorption bands at 3104, 1715, 1602, 1600, 1496, 1371, 1152, 826, and 701 $cm^{-1}$.

Another primer which has been found to be suitable to adhere rubber to the composite is CHEMLOK 252X, also manufactured by Lord Corporation. This primer is similar to CHEMLOK 254 except that one of the ingredients which exists in the 254 formulation is formed in situ by oxidizing the same with a lead salt.

An example of another suitable primer is an aqueous metal primer composition containing a polyvinyl alcohol-stabilized aqueous phenolic resin dispersion, a latex of a halogenated polyolefin, and metal oxide. Such a compound is described in U.S. Pat. No. 5,200,455, which is hereby fully incorporated by reference with regard to all aspects thereof, including the making and preferred embodiments of the aqueous metal primer composition.

Figure 2:
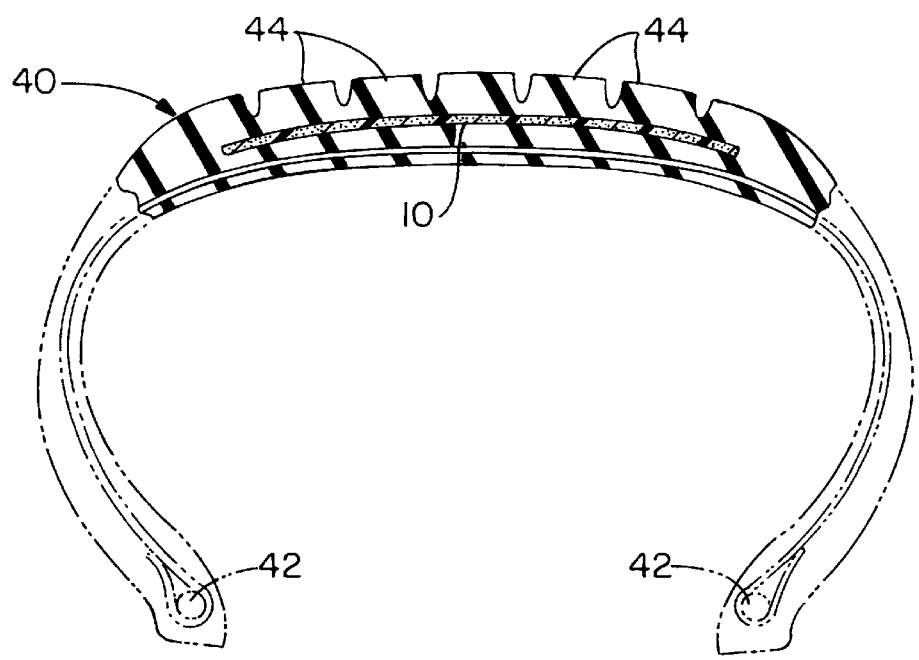
FIG. 2 is a cross sectional view showing the composite utilized as a belt in a tire.

Referring to the drawings, FIG. 1 is a cross sectional view along the length of the composite fibers showing a high strength, high modulus composite 10 of the present invention adhered to rubber 30 through the use of primer 20. The resulting laminate, as noted above, can be utilized wherever an exceedingly high modulus and strength composite bound to a rubber is desired such as in engine mounts, muffler clamps, and the like. A preferred end use of the present invention is utilization of the composite 10 as one or more reinforcing belts as in a tire 40 (see FIG. 2) having tire beads 42 and various other components of a tire such as tread 44, including tread and portions, an innerliner, sidewalls, a carcass, and the like, as is well known to the art and the literature. FIG. 2 is a cross sectional view of the tire wherein the primer is not shown and the composite fibers are transverse to that shown in FIG. 1, i.e., generally extend into and out of the plane of the drawing sheet.

The invention will be better understood by reference to the following examples which serve to illustrate, but not to limit the scope of the present invention.

CONTROL AND EXAMPLE 1

Two pieces, 6×6×0.075 inches, composed of graphite fibers impregnated with a thermoplastic polyphenylene sulfide resin were sandblasted on one surface, washed with acetone on RYMPLECLOTH (a purified cheesecloth) and allowed to dry. A control was coated with a BANDAQ retread commercial cement, and the other was coated with CHEMLOK 254 (Lord Chemical Co.). The cement and primer were allowed to thoroughly dry for 15 to 20 minutes.

The rubber to be bonded was prepared by laminating a piece of reinforcing ply material (6×6×0.040 inches) onto the test material. The ply material was a ply skim for a tire composed of natural rubber and other conventional compounding ingredients such as carbon black, zinc oxide, curatives, antioxidants, and the like. The dimensions of the test rubber were 6×6×0.100 inches.

Figure 3:
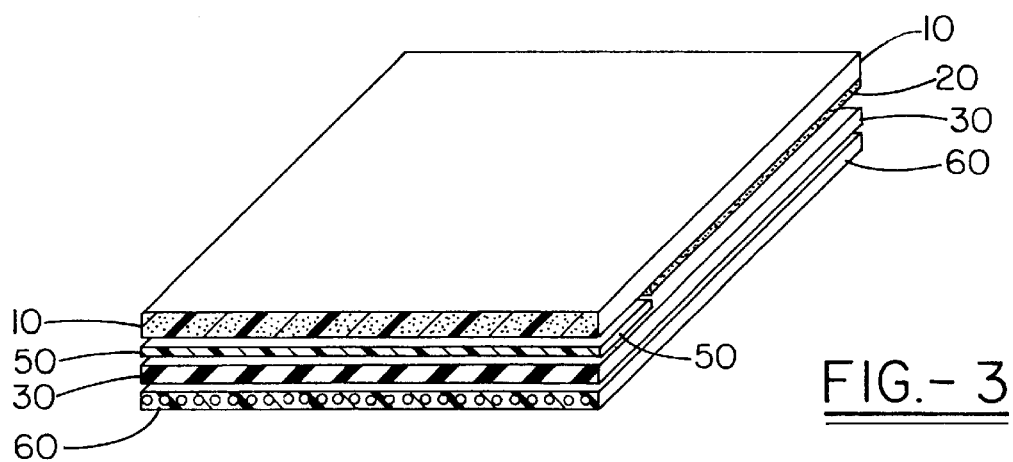
FIG. 3 is perspective view showing the preparation of a sample for peel adhesion testing.

The reinforced rubber was then assembled with the rubber 30 surface to be tested facing the CHEMLOK 254 primer 20 applied to the graphite fiber/PPS composite 10. This construction is generally shown in FIG. 3 For purposes of testing, one end of composite 10 was separated from a corresponding end of rubber 30 backed with a reinforcing ply 60 by a nonadherent separator 50. The rubber was cured 30 minutes at 300° F. Separator 50 was then removed. The peel adhesion test was carried out by gripping the free end of the composite and the free end of the rubber containing the reinforcing backing material thereon. Results are set forth in Table I.

TABLE I

Peel Adhesion

| | Peak (Pli) | Avg. (Pli) | Failure | Primer | Condition |
|---|---|---|---|---|---|
| Control | 0.72 | 0.72 | Interfacial | BANDAQ | Composite was sandblasted |
| Ex. 1 | 265 | 108 | To Backing | CHEMLOK 254 | Composite was sandblasted |

EXAMPLES 2–4

Three additional samples were tested. The examples were built as described in Examples 1. In Example 2, however, the surface of the composite (i.e., graphite/PPS) was not sandblasted whereas Examples 3 and 4 were sandblasted. Examples 2, 3, and 4 used a different CHEMLOK primer, 252X (Lord Chemical Co.). It was found that the utilization of 252X required the use of a retread cement on the rubber in order to obtain good adhesion. The particular cement utilized was retread and vulcanizing cement, No. 16-215 manufactured by the Patch Rubber Co. This commercial cement is prepared from a mixture of natural and styrene/butadiene polymers containing tackifiers, carbon black and resins in a toluene/hydrocarbon solvent blend. The results of Examples 2–4 are shown in Table II.

TABLE II

Peel Adhesion Results on Composite (Graphite/PPS) Using Various Conditions and CHEMLOK 252X

| | Peak (Pli) | Avg. (Pli) | Conditions | Failure |
|---|---|---|---|---|
| Ex. 2 | No Adhesion | | Composite not sandblasted Primer-CHEMLOK 252 | Interfacial |
| Ex. 3 | 138 | 49.2 | Sandblasted, Primer-CHEMLOK 252X With Retread Cement on Rubber | To Backing |
| Ex. 4 | 57.2 | 16 | Sandblasted, Primer-CHEMLOK 252X No Retread Cement on Rubber | To Backing |

In this case it is noted that a retread cement is necessary in order to obtain excellent adhesion with CHEMLOK 252X primer.

EXAMPLES 5–8

Further examples of the invention include bonding to another composite. The composite was a high modulus, glass filled polyurethane. Four examples were prepared, all sandblasted and bonded to a skimstock rubber in a manner as in examples 1 through 4. Two of the examples used CHEMLOK 254 primer and two samples used the CHEMLOK 252X primer. Each primer system also evaluated the effect of using the above mentioned retread cement, that is, with and without the retread cement on the rubber. The results of examples 5–8 are shown in Table III.

TABLE III

Peel Adhesion Results on a High Modulus, Glass Filled Polyurethane

| | Peel Adhesion | | | |
|---|---|---|---|---|
| | PLI | PLI | Conditions | Failure |
| Ex. 5 | 282 | 206 | Sandblasted, primer CHEMLOK 254 without retread cement | No failure |
| Ex. 6 | 250 | 143 | Sandblasted, primer-CHEMLOK 254 with retread cement | No failure |
| Ex. 7 | 247 | 129 | Sandblasted, primer CHEMLOK 252X without retread cement | No failure |
| Ex. 8 | 265 | 147 | Sandblasted, primer CHEMLOK 252X with retread cement | No failure |

As apparent from Examples 5–8, when a polyurethane glass filled composite was utilized, a retread cement was not necessary.

While in accordance with the Patent Statutes, the best mode and preferred embodiment have been set forth, the scope of the invention is not limited thereto, but rather by the scope of the attached claims.

What is claimed is:

1. A pneumatic tire, comprising;
   a carcass, sidewalls, tire beads, and a tire tread, said tire having at least one high modulus puncture resistant composite belt having a modulus of elasticity of at least 750,000 psi thereby rendering said tire essentially flat free,
   said at least one high modulus puncture resistant composite belt comprising a thermoplastic binder having a melting point of at least 225° C. and a reinforcing fiber, the amount of said fiber being from about 40 parts to about 90 parts by weight for every 100 parts by weight of said thermoplastic binder.

2. A pneumatic tire according to claim 1, wherein said binder is polyphenylene sulfide, polyimide, polyurethane, or polyurea, or combinations thereof, and wherein said fiber is a carbon fiber, a glass fiber, a boron fiber, a nylon fiber, a polyester fiber, or a graphite fiber, or combinations thereof.

3. A pneumatic tire according to claim 2, wherein said melting point of said thermoplastic binder is at least 275° C., wherein said thermoplastic binder is said polyphenylene sulfide, said polyimide, or combinations thereof, and wherein said fiber is said carbon fiber, said graphite fiber, or combinations thereof, and wherein the amount of said fiber is from about 50 parts to about 85 parts by weight.

4. A pneumatic tire according to claim 3, wherein said modulus of elasticity of said at least one high modulus puncture resistant composite belt is at least 1,000,000 psi.

* * * * *